United States Patent [19]

Frank

[11] Patent Number: 5,014,763
[45] Date of Patent: May 14, 1991

[54] METHOD OF MAKING CERAMIC CORES

[75] Inventor: Gregory R. Frank, Muskegon, Mich.

[73] Assignee: Howmet Corporation, Greenwich, Conn.

[21] Appl. No.: 277,853

[22] Filed: Nov. 30, 1988

[51] Int. Cl.⁵ ............................................. B22C 1/16
[52] U.S. Cl. ..................................... 164/15; 164/525; 164/529
[58] Field of Search ................. 164/15, 522, 525, 528, 164/529

[56] References Cited

U.S. PATENT DOCUMENTS

| | | | |
|---|---|---|---|
| 2,749,586 | 6/1956 | Kohl et al. | 164/525 |
| 2,820,268 | 1/1958 | Kohl et al. | 164/525 |
| 2,869,215 | 1/1959 | Smith | 264/28 |
| 2,893,102 | 7/1959 | Maxwell et al. | 264/28 |
| 2,944,316 | 7/1960 | Maxwell et al. | 264/28 |
| 3,048,905 | 8/1962 | Benson | 164/516 |
| 3,160,931 | 12/1964 | Leach | 164/525 |
| 3,213,497 | 10/1965 | Scott | 164/525 |
| 3,222,435 | 12/1965 | Mellen, Jr. et al. | 264/28 |
| 4,113,480 | 9/1978 | Rivers | 75/214 |
| 4,225,346 | 9/1980 | Helliker et al. | 75/211 |
| 4,569,821 | 2/1986 | Duperray et al. | 419/2 |
| 4,734,237 | 3/1988 | Fanelli et al. | 264/122 |

FOREIGN PATENT DOCUMENTS

| | | | |
|---|---|---|---|
| 727003 | 2/1966 | Canada | 164/525 |
| 215566 | 10/1985 | Japan | 164/97 |
| 2053757 | 2/1981 | United Kingdom | 164/34 |
| 2096153 | 10/1982 | United Kingdom | 164/529 |

Primary Examiner—Richard K. Seidel
Assistant Examiner—Edward Brown
Attorney, Agent, or Firm—Reising, Ethington, Barnard, Perry & Milton

[57] ABSTRACT

A novel method of making a ceramic core for use in casting a metal component includes freezing a ceramic slurry comprising a ceramic powder filler, a freezable liquid and a gelling agent in a mold to form a frozen core shaped body. The frozen core shaped body is removed from the mold and thawed to room temperature. A high viscosity gel is provided in the core shaped body at room temperature that is strong enough to retain the core shape until the body can be fired to form a porous, sintered ceramic core. The gel present at room temperature may be formed as the ceramic slurry is cooled in the mold cavity to form the frozen article shaped body and/or as the frozen core shaped body is thawed to room temperature.

27 Claims, 2 Drawing Sheets

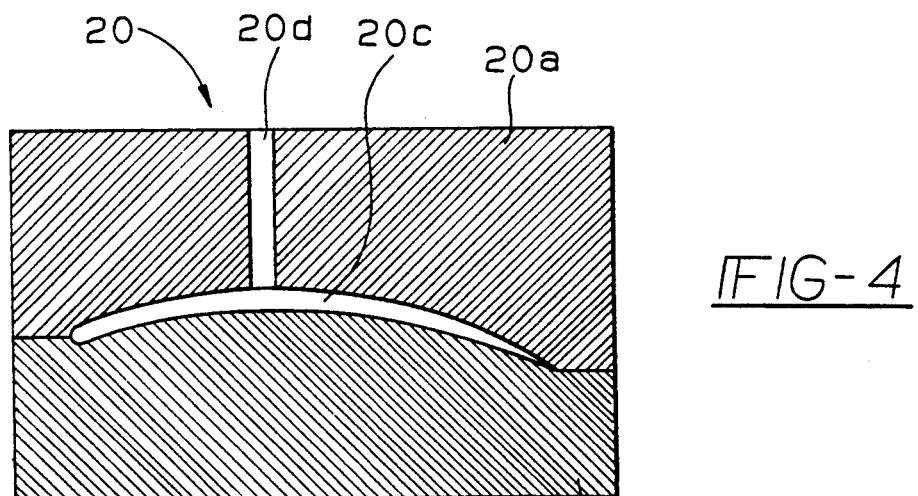
FIG-3
FIG-4
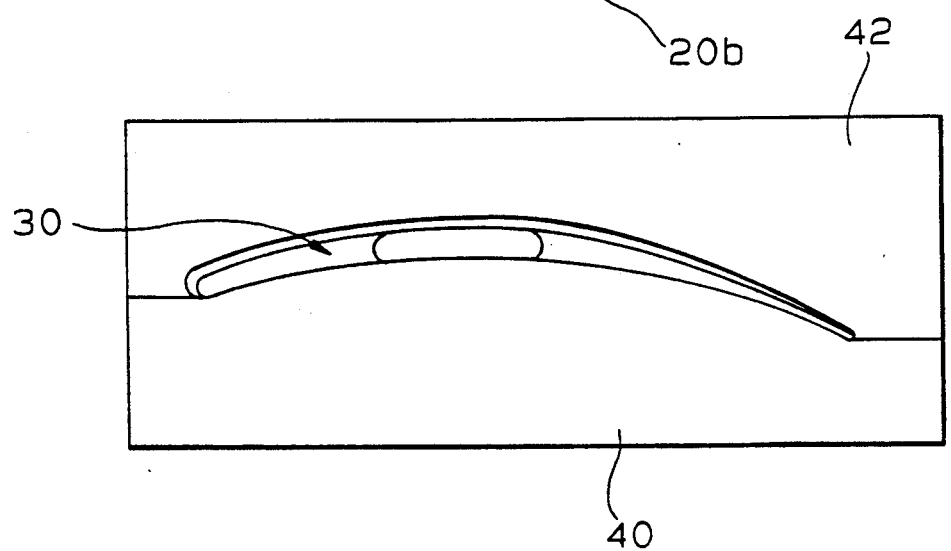
FIG-5
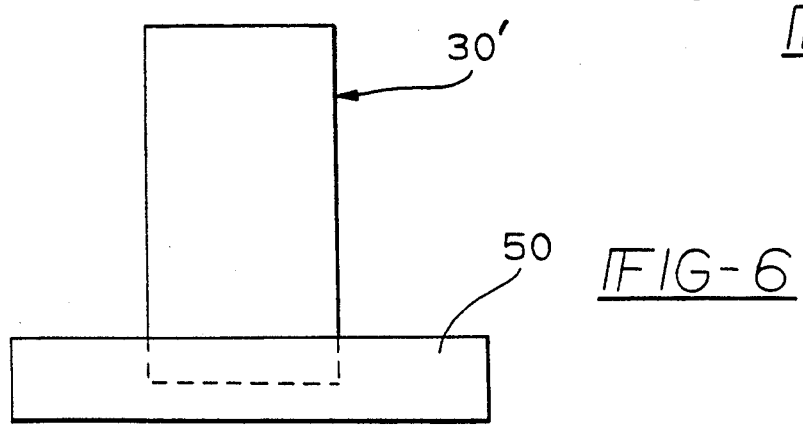
FIG-6

METHOD OF MAKING CERAMIC CORES

FIELD OF THE INVENTION

The invention relates to a method of making shaped articles, such as ceramic cores for metal casting, from a slurry of ceramic or other particulate material.

BACKGROUND OF THE INVENTION

As is known, expendable ceramic cores have been employed in conjunction with the "lost wax" process to produce ceramic shell molds for the investment casting of various types of precision components, such as for example hollow gas turbine engine blades and vanes. In casting these precision components, the ceramic core typically is quite thin in cross-section and may include complex details to form narrow cooling channels, internal support ribs and other features on the cast blade or vane component. The ceramic core must remain physically and chemically stable at high casting temperatures, be relatively non-reactive with the molten metal being cast and be leachable from the casting within a commercially reasonable time. Moreover, the ceramic core must meet stringent dimensional tolerances mandated by users of the component cast around the core.

In attempts to satisfy these requirements, various techniques, such as transfer molding and injection molding, have been developed to make ceramic cores for metal casting applications. Although these techniques have been developed to the degree that satisfactory ceramic cores can be made, they are relatively costly to practice and result in ceramic cores that add considerably to the cost of making the cast metal component.

In particular, transfer molding techniques typically involve molding a mixture of ceramic particulate and an expensive thermosetting binder to desired shape with the binder assisting in molding of the desired shape and retaining of the as-molded core shape until a subsequent firing step to sinter the ceramic core particulate. During this firing process, if present the solids content of the binder material sinters with the ceramic particulate and becomes an integral part of the ceramic article.

The injection molding technique suffers disadvantages in that this technique typically involves injection molding a mixture of ceramic particulate and a relatively high percentage (e.g. 10% to 20% by weight) of a thermoplastic binder, such as wax, subjecting the molded core shape to a lengthy elevated temperature "prebake" treatment (e.g. 24 to 100 hours at 38° C. to 550° C.) in a powder binder-absorbing media to remove some or all of the binder and thereafter firing the core shape to produce a sintered ceramic core. The "prebake" step is not only costly but also essential in wax-based binder systems to avoid slumping, cracking and blistering of the core during the firing (sintering) step.

U.S. Pat. No. 3,222,435 issued Dec. 7, 1965, and U.S. Pat. No. 4,737,234 issued Mar. 29, 1988 describe injection molding techniques for making ceramic cores for use in metal casting wherein the core shape is rigidized in a mold by setting of a binder or gel in a ceramic slurry injected into the mold. In both patents, the molded, rigidized core shape is sintered upon removal from the mold.

Powder molding techniques wherein the desired shape is rigidized in a mold by freezing a particulate slurry injected into the mold are described in U.S. Pat. Nos. 2,893,102 issued July 7, 1959, 2,869,215 issued Jan. 20, 1959 and 2,944,316 issued July 12, 1960. In the first two of these patents, a molding slurry or slip is injected into a mold maintained at a temperature to freeze the slip to desired shape, the frozen shape is dried outside the mold without development of a liquid phase and then the dried shape is sintered. The frozen core shape is dried by either subliming the frozen water from the molded core shape in a vacuum chamber or by enclosing the frozen core shape in a powder drying/supporting agent which not only absorbs moisture from the core shape as it thaws but also supports the core shape to avoid deformation thereof that would otherwise occur during thawing.

In the last of these patents (U.S. Pat. No. 2,869,215), the molding slip is devoid of any viscous binder and is pretreated to remove water in excess of 2%–4% by weight prior to freezing in the injection mold to shape the slip. After removal from the mold, the frozen shape is thawed under conditions which tolerate the total absence of the binder in the molding slip.

It is an object of the invention to provide a method of making shaped articles, especially ceramic cores for use in metal casting, from a slurry mixture of a freezable liquid and particulate material in a manner that is cost effective in terms of materials, equipment and processing steps employed and that overcomes the disadvantages associated with the methods described hereinabove. In particular, the method of the invention eliminates the need for expensive binders in the slurry mixture, eliminates the need for costly treatment of the slurry mixture prior to molding to remove excess liquid binder, eliminates the need for costly "prebake" treatment in a powder packing media or drying treatments in a vacuum chamber prior to sintering and eliminates the need for complex, costly sintering treatments, all without compromising the overall quality and performance of the ceramic core in metal casting.

SUMMARY OF THE INVENTION

The invention contemplates a method of making articles of various types from particulate material such as metal powders, ceramic powders and mixtures thereof which achieve these objects and advantages.

The method of the invention as applied to making a ceramic core for use in metal casting contemplates the steps of (a) forming a ceramic slurry of a freezable liquid, ceramic powder and a gelling agent, (b) forming the ceramic slurry into a core shaped body including (1) introducing the slurry into a core shaped mold cavity and reducing the temperature of the slurry at least to the freezing temperature of the liquid to freeze the slurry in the mold cavity and form a frozen core shaped body therein, (2) removing the frozen core shaped body from the mold cavity, (3) raising the temperature of the frozen core shaped body after removal from the mold cavity to an ambient temperature (e.g., room temperature) above the freezing temperature (4) gelling the liquid and the gelling agent at a temperature above the freezing temperature (e.g., before and/or after freezing of the slurry) such that a gel is present in the core shaped body at the ambient temperature to retain the freeze formed core shape at the ambient temperature, and then (c) heating the core shaped body to form a sintered ceramic core. Gelling of the liquid and the gelling agent may occur as the temperature of the ceramic slurry is reduced in the mold cavity to effect freezing of the ceramic slurry and/or as the temperature of the frozen core shaped body is raised to the ambient temperature. Preferably, the temperature of the frozen core shaped body is raised by thawing to room temperature.

The invention, however, is not limited to making ceramic cores for metal casting and may be used to make other articles from particulate material such as metal powders, ceramic powders and mixtures thereof.

The method of the invention also contemplates dispersing reinforcing media, such as ceramic whiskers, fibers, cloth, felts, etc., in the ceramic slurry such that the reinforcing media is contained inside the body of the sintered ceramic article to enhance its high temperature stability. The enhanced high temperature stability of the particulate reinforced ceramic cores of the invention results in the casting of more dimensionally consistent metal components around the individual ceramic cores.

These and other objects and advantages of the invention will become more fully apparent from the following drawings and detailed description.

BRIEF DESCRIPTION OF THE DRAWINGS

FIG. 3 is an end elevational view of the airfoil-shaped ceramic core looking toward the tip 16.

FIG. 4 is a schematic cross-sectional view of an injection mold having an airfoil-shaped shaped mold cavity;

FIG. 5 is an end elevation of the frozen core shape between two fired ceramic setters (the space between the upper ceramic setter and the core shaped body 30 shown exaggerated); and FIG. 6 is a side elevational view of a frozen ceramic core of different shape placed on end on a fired ceramic setter.

DETAILED DESCRIPTION OF THE INVENTION

Although the invention is described in detail hereinbelow with respect to making a thin ceramic core for ultimate use in casting a metal airfoil member therearound, those skilled in the art will appreciate that the invention not so limited and may be used to make ceramic cores of myriad configurations, both simple and complex, for use in casting of molten metal therearound. Moreover, the invention may be used to make shaped articles of myriad types and of various particulate materials; e.g. metal particulate, ceramic particulate, and mixtures thereof.

Figure 2:
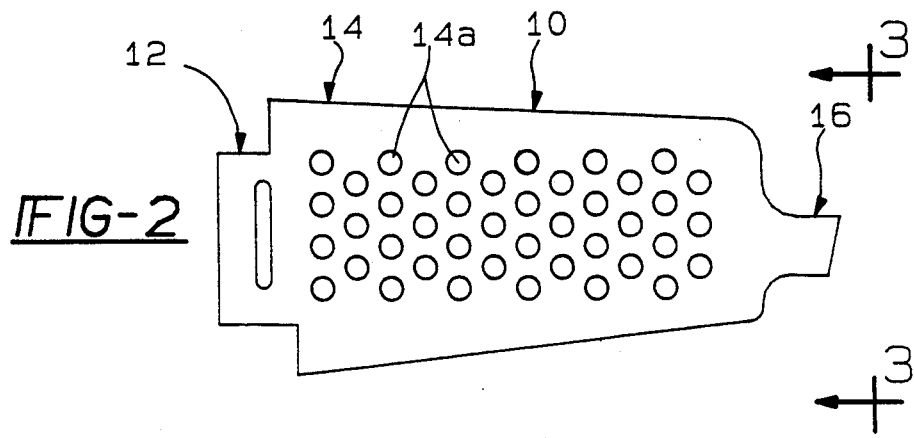
FIG. 2 is a side elevational view of an airfoil-shaped ceramic core made in accordance with the method of the invention

Referring to FIGS. 2-3, the ceramic core 10 for use in the casting of an airfoil member (not shown) therearound includes a typical root end 12, an airfoil section 14 and a tip end 16. The airfoil section 14 includes a plurality of spaced apart "pedestal" holes 14a extending therethrough to form support pedestals (not shown) inside the metal airfoil member cast around the ceramic core 10 as is known in the art.

Figure 1:
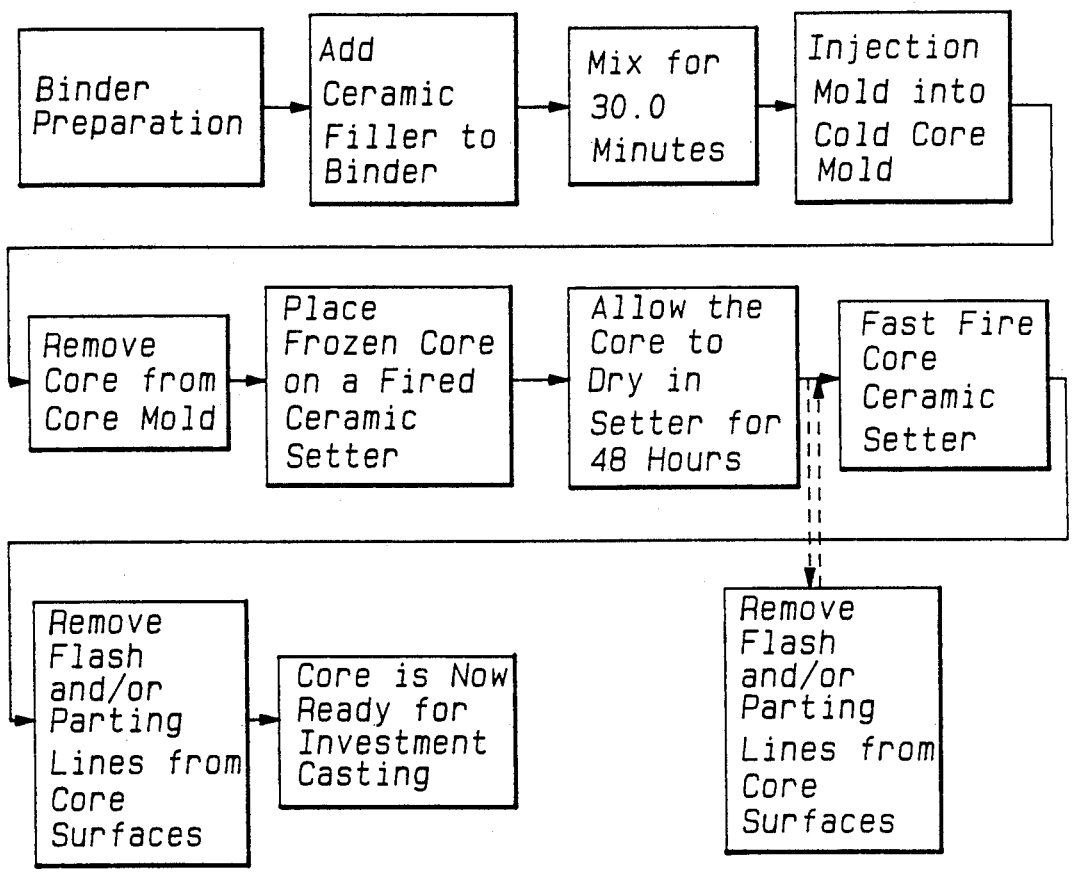
FIG. 1 is a process flow chart in accordance with the method of the invention.

A process flow chart depicting a preferred method of the invention for making the ceramic core 10 is shown in FIG. 1. As shown, the method involves preparation of a ceramic slurry batch from a binder component and a ceramic powder filler component. Preferred compositions of the ceramic filler and the ceramic slurry batch are set forth below in Tables A and B.

TABLE A

Ceramic Powder Filler Composition

| | Material | Weight Percent |
|---|---|---|
| (1) | Fused Silica Flour* | 82.52 |
| (2) | Zircon Flour* | 11.29 |
| (3) | Tabular Alumina* | 5.59 |
| (4) | Feldspar* | 0.60 |
| | | 100.00% |

*Constituent (1) comprises a mixture of
(a) 57.03% by weight GP-1 fused silica of −325 mesh available from Harbison Walker P.O. Box 548, Calhoun, Ga. 30701
(b) 12.31% by weight GP151 fused silica of −325 mesh size available from Harbison Walker.
(c) 13.19% by weight fused silica of 10 micron size available from Nalco Chemical Corp. 9165 South Harbor Ave. Chicago, Ill. 60617
*Constituent (2) having −325 mesh size available from Remet Corp., P.O. 278, Chadwicks, New York 13319
*Constituent (3) having −325 mesh size available from Aluminum Co. of America, 610 New Center Bldg. Detroit, Michigan 48202
*Constituent (4) having 200 mesh size available from Incore Div. Of International Minerals, 666 Garland Place, Des Plaines, Ill. 60016

As is apparent, the ceramic filler composition is comprised predominantly of fused silica which has been used heretofore in ceramic cores for metal casting as a result of its excellent thermal shock resistance, ease of leaching from the metal casting, low thermal expansion properties and ready availability. The zircon ($ZrO_2 \cdot SiO_2$) constituent imparts refractoriness to the final sintered ceramic core during casting of molten metal therearound at elevated temperatures. The alumina and feldspar constituents serve to flux the core shape during the subsequent firing (sintering) step to be described hereinbelow to thereby develop the required core strength and microstructural properties at lower sintering temperatures than would otherwise be possible without these fluxing agents.

The above-described ceramic powder filler is mixed with a freezable liquid binder component to form a ceramic slurry batch whose composition is set forth in Table B.

TABLE B

Ceramic Slurry Batch Composition

| | Material | Weight Percent |
|---|---|---|
| (a) | Ceramic Filler Component | 78.03 |
| (b) | Binder Component: | |
| | (1) De-ionized water | 19.18 |
| | (2) Knox ® gelling agent | 1.20 |
| | (3) Surfynol ® 104E dispersant/wetting agent* | 0.82 |
| | (4) Mobilcer ® X plasticizing/ lubricating agent* | 0.77 |

*Constituent (2) available from Kind and Knox Park 80 West, Plaza 2, Saddle Brook, New Jersey 07662
*Constituent (3) available from Air Products and Chemicals, Inc., P.O. Box 20662 Allentown, Pa. 18001
*Constituent (4) available from Mobil Oil Corp., Special Products Division 3225 Gallows Road Fairfax, Va. 22037

As is apparent, the binder composition is predominantly de-ionized water (or other freezable liquid) which serves as a solvent for the other water soluble to slightly water soluble binder constituents (2)-(4) and as a carrier for the ceramic powder filler. The gelling agent comprises a water soluble gelatin of the protein type having a gelling temperature in the aqueous solution of room temperature or below. The Surfynol 104E dispersant/wetting agent is slightly water soluble and functions as a dispersant and wetting agent to effect a high solids loading level in the aqueous solution (e.g. approximately 58.0 volume percent of solids in the final injectable slurry). This agent also functions as a defoaming agent. The Mobilicer X is a wax emulsion that acts as a plasticizing and lubricating agent during injection of the slurry batch into the injection mold.

The ceramic slurry batch is prepared in the following manner:

(1) The ceramic powder filler constituents are mixed together and warmed to between about 60° C. and about 66° C.

(2) The gelling agent is added to boiling de-ionized water in a metal container. De-ionized water is preferred as the solvent/carrier since it contains no alkalis which can subsequently adversely affect the sintering characteristics of the core.

(3) The Mobilcer X plasticizing/lubricating agent is added to the boiling water and the solution and is stirred until the plasticizing/lubricating agent is completely melted and dispersed.

(4) The temperature of the solution of step (3) is then reduced to about 35° C. to about 40° C. but above the gelling temperature of the solution.

(5) The cooled solution of step (4) is then introduced into a conventional double planetary style mixer. The temperature of the solution is maintained at about 38° C. during mixing and until completion of the mixing steps; i.e. until completion of step (10).

(6) One-third (⅓) of the heated ceramic powder filler (i.e. heated in step (1)) is added to the solution in the double planetary mixer and is mixed at a low blade speed (e.g. 70 rpm) for 5 minutes.

(7) Another one-third (⅓) of the heated ceramic powder filler is then added and mixed at the aforesaid low blade speed for 5 minutes.

(8) One-half of the required amount of the dispersant/wetting agent is then added to the batch of step (7). The dispersant/wetting agent is mixed into the batch for 2 minutes at the aforesaid low blade speed. If desired, a defoaming agent such as 2-ethyl-hexanol may optionally be added to the batch at this point.

(9) The remaining one-third (⅓) of the heated ceramic powder filler is then added to the batch and mixed at the aforesaid low blade speed for 5 minutes

(10) The remaining one-half(½) of the dispersant/wetting agent is then added to the batch and mixed at the aforesaid low blade speed for 30 minutes. The resultant ceramic slurry batch includes approximately 58.0 volume percent of solids (ceramic powder filler) and is ready to be injection molded.

FIG. 4 illustrates schematically an injection mold (core mold) 20 having openable and closeable mold halves 20a, 20b and a mold cavity 20c formed therebetween and shaped to produce the ceramic core shape shown in FIGS. 2-3. The injection mold 20 is part of a conventional injection molding machine available from Mueller Phipps International, Todd Hill Road, Poughkeepsie, N.Y. The injection molding machine is designed to squeeze the ceramic slurry under pressure through the mold passage 20d and into the mold cavity 20c.

The ceramic slurry is maintained at about 35° C. to about 45° C. in the holding chamber o the injection molding machine prior to injection into the mold cavity 20c. This temperature range (i.e. 35° C. to 45° C.) is above the gelling temperature of the slurry.

Injection pressures of about 200 psi to about 1000 psi are typically used to inject the ceramic slurry into the mold cavity 20c to fill same. When the ceramic slurry is injected into the mold cavity 20c, the binder component functions as a carrier for the ceramic powder filler to insure that the mold cavity 20c is filled completely with the slurry.

The injection mold 20 is preferably maintained at a temperature in the range of about −20° C. to about −30° C. (or other temperature at or below the freezing temperature of the liquid binder component) to freeze the ceramic slurry (i.e., the liquid binder component) injected into the mold cavity 20c in a relatively short time. For example, when the injection mold 20 having the airfoil shaped mold cavity 20c is maintained at about −20° C. to about −30° C., the ceramic slurry typically freezes and becomes rigidized after about 15 seconds to about 60 seconds in the cooled mold 20 and thereby freeze forms the desired core (airfoil) shaped body 30 in the mold cavity 20c. The rigidity of the frozen core shaped body 30 is provided predominantly by the frozen state of the liquid binder, not upon any gelling action which may have developed in the ceramic slurry as the temperature thereof is reduced in the mold cavity below the freezing temperature of the liquid binder component.

As the temperature of the ceramic slurry is reduced in the mold cavity 20c, some gelling of the binder water and the gelling agent can occur at temperatures above the freezing temperature depending upon the cross-section and mass of the core shaped body to be formed. Core shaped bodies with larger cross-sections and masses will take longer times to cool to the freezing temperature throughout the entire cross-section and thus provide more opportunity for gelling of the liquid water and gelling agent before the freezing temperature is reached. Thinner, less massive core shaped bodies will require less time to freeze through the cross-section and thus will afford less opportunity for gelling of the water and gelling agent during cooling of the ceramic slurry. Any gel formed in the ceramic slurry as it is cooled in the mold cavity 20c will eventually be frozen in the core shaped body 30 freeze formed in the mold cavity 20c. As mentioned hereinabove, the rigidity of the frozen core shaped body 30 is provided predominantly by the frozen stat of the liquid binder, not by any gelling action which may have taken place during cooling of the slurry in the mold.

After the rigid, frozen core shaped body 30 is formed in the mold cavity 20c, the injection mold 20 is opened and the frozen core shaped body 30 is removed from the mold 20. The frozen core shaped body 30 is initially separated from (lifted off) the opened mold 20 using a handheld gun (not shown) to direct refrigerated air (e.g. maintained at about −17° C. to about −46° C.) against the frozen core shaped body 30 and then the frozen core shape 30 is removed by hand (or robot) from the opened mold 20. Alternatively, pop-up ejector pins (not shown) may be used to initially separate or disengage the frozen core body 30 from the mold for subsequent hand removal.

As shown in FIG. 5 for one embodiment of the method of the invention, the frozen core shaped body 30 is immediately placed on a lower ceramic setter 40 that is positioned adjacent the injection mold 20. The ceramic setter 40 is maintained at room temperature. The frozen core shaped body 30 is shown placed on its lateral side on the ceramic setter 40. For highly complex core shapes such as the airfoil shape shown, an upper ceramic setter 42 (also maintained at room temperature) is placed atop the lower ceramic setter 40 to form a cavity 44 having a shape complementary to that of the frozen core shaped body 30 and in close tolerance fit therewith to minimize warpage of the core shape as it thaws slowly up to room temperature and also during subsequent firing of the dried core shaped body 30. For other less complex airfoil core shapes, the frozen core shaped body 30 may be placed on only the lower ceramic setter 40 without a need for the upper ceramic setter 42.

In accordance with a preferred embodiment of the method of the invention, the frozen core shaped body 30 is thawed slowly up to room temperature (e.g. 20° C. to 30° C.) following removal from the injection mold 20 and placement between the ceramic setters 40,42. Thawing takes place under ambient temperature and pressure conditions without the need for vacuum equipment or a powder binder-absorbant packing media. As the frozen core shaped body 30 slowly thaws, any gel formed prior to freezing of the ceramic slurry in the mold cavity 20c thaws to provide a high viscosity gel in the core shaped body and becomes effective to sufficiently rigidize the freeze formed core shape of the body 30 to retain its molded freeze formed shape as it thaws. Moreover, during thawing above the freezing temperature of the liquid binder component, any ungelled frozen water constituent present in the binder may transform to the liquid phase (i.e. liquid water) and gel with any remaining gelling agent present in the binder. A gel can thereby be developed in-situ in the core shaped body 30 during thawing. In any event, the conditions of cooling of the ceramic slurry in the mold cavity 20c and thawing of the frozen core shaped body 30 outside of the mold cavity 20c are effective to provide a high viscosity gel in the core shaped body 30 at room temperature to retain the freeze formed (molded) core shape at room temperature.

Typically, the gel begins to thaw and/or develop soon after the frozen core shaped body 30 is removed from the mold 20 and forms on the core shaped body an outer envelope with a well developed high viscosity gel structure after approximately 15 minutes of thawing under ambient temperature and pressure conditions. Prior to this time, the frozen core shaped body 30 can be reverted back (recycled) into the ceramic slurry batch in the holding chamber of the injection molding machine for reuse in the event the frozen core shaped body is defective or unsatisfactory for some reason. With continued thawing, the gel continues to thaw and/or develop from the outer envelope toward the center of core shaped body 30 and eventually sufficiently rigidizes the core shaped body 30 into a self-supporting, non-fluid mass. In particular, the gel that is thawed and/or developed in the core shaped body 30 during thawing establishes a sufficiently strong bonding structure to retain the as-frozen (as-molded) core shape without slumping during and after thawing to room temperature.

The frozen core shaped body 30 preferably remains between the ceramic setters 40, 42 for an aggregate of about 48 to about 100 hours to effect complete thawing of the core shaped body 30 to room temperature with concomitant gel-rigidization as described hereinabove and to effect at least partial drying of the core shaped body 30. Preferably, during this period, a substantial portion of the total weight of the liquid binder component is evaporated from the core shaped body 30.

Those skilled in the art will appreciate that the times required for thawing of the core shaped body 30 to room temperature and evaporation of at least some of the liquid binder component will depend on the cross-sectional thickness and mass of the core shaped body 30. Core shapes of greater thickness and/or mass will require longer times. However, it is not essential that all of the binder component be evaporated from the core shape 30 prior to the subsequent firing step. For example, for a core shaped body having a thickness of 0.25 inch, about 80% by weight of the binder component of the core shaped body 30 is evaporated after 48 hours of thawing and drying. Furthermore, those skilled in the art will appreciate that thawing and drying of the shaped core body 30 may be hastened by suitable means such as, for example, by applying heat to the body using IR lamps, hot air flow and other heat applying means and/or by decreasing relative humidity of the ambient air during thawing and drying.

Following thawing and drying of the core shaped body 30, the ceramic setters 40, 42 and the core body 30 still positioned therebetween are placed in a conventional kiln and fast fired to a top-end (maximum) temperature of about 1232° C. for an aggregate period of about 24 hours. The heating rate to this temperature typically is 111° C./hour. During the firing cycle, the gelling agent and plasticizing/lubricating agent burn out relatively cleanly from the body 30 while the individual ceramic powder grains or particles undergo inter-particle sintering mechanisms familiar to those skilled in the art to bond the grains or particles to one another. The fluxing agents of the ceramic filler (i.e. the alumina and feldspar constituents) permit development of the required core strength and core microstructural properties at lower firing temperatures than would otherwise be possible in their absence. The zircon ($ZrO_2$-$SiO_2$) constituent imparts required refractoriness to the sintered ceramic core appropriate to withstand the metal casting temperatures (e.g. 1200° C.–1550° C.) to be subsequently encountered by the core.

As the binder constituents are burned out of the core during firing, an open, interconnected network of porosity is established in the ceramic core. This network is highly beneficial in facilitating subsequent removal of the core from the metal airfoil member cast therearound by known chemical leaching techniques since the network provides ready ingress of the fluid leachant into the sintered core to dissolve the ceramic constituents.

The resultant porous, sintered ceramic core 10 has been found to possess physical and chemical properties which are more than satisfactory for use in investment casting of molten metal therearound to form a cast metal airfoil member therearound. For example, satisfactory IN713 type nickel base superalloy airfoils have been cast around individual ceramic cores made as described hereinabove in accordance with the invention. The ceramic core has been successfully removed from the IN713 cast airfoil in less than about 25 hours using a hot aqueous caustic solution familiar to those skilled in the art for removing silica base cores. Post casting examination of the cast IN713 airfoil showed no adverse reaction between the ceramic core and the IN713 type alloy and confirmed that the ceramic core remained stable, physically and chemically, throughout the casting process Average physical and chemical properties of a large number (e.g. about 20) of porous, sintered ceramic cores made in accordance with the method of the invention are set forth below in Table C wherein all properties were measured at room temperature unless otherwise specified.

TABLE C

| Core Properties | |
| --- | --- |
| Modulus of Rupture | 2100 psi |
| Modulus of Elasticity | $1.17 \times 10^6$ psi |
| Apparent Porosity | 33 volume percent |
| Bulk density | 1.62 gm/cc |
| Apparent Density | 2.41 gm/cc |
| Thermal Expansion at 960° C. | 0.31% |
| Cristobalite Content | 25 weight percent |

As illustrated in FIG. 1, excess flash and parting lines formed on the ceramic core during molding in the mold cavity 20c can be removed prior to or after the sintering operation. In particular, the thawed, gel-rigidized, dried self-supporting core shaped body 30 is strong enough prior to sintering to withstand "green machining" to remove flash and parting lines without damage to the body. Alternatively, flash and parting lines can be removed from the ceramic core after sintering.

In a particularly preferred method of the invention, the high temperature stability of the ceramic core is further enhanced by dispersing approximately 4 volume percent of high purity single crystal alpha aluminum oxide (alumina) ceramic whiskers throughout the sintered ceramic core 10. In particular, the ceramic whiskers are intermixed with the ceramic powder filler using a conventional high speed shear mixing procedure in step (1) of the slurry batch preparation procedure. Then, the ceramic filler having the whiskers intermixed therewith is added to the boiling de-ionized water in the succeeding steps (6), (7) and (9) of that procedure. The method of the invention is thereafter practiced as set forth hereinabove to produce the porous, sintered whisker-reinforced ceramic core having the ceramic whiskers dispersed uniformly in the sintered ceramic powder matrix. High purity single crystal alpha alumina ceramic whiskers which have proved useful in this embodiment of the invention are available from Vista Corporation, Houston, Tex., and are characterized by an average aspect ratio of 3-10 with an average diameter between about 0.50 and about 30.00 microns.

Dispersion of 4 volume percent of these ceramic whiskers uniformly in the sintered ceramic powder matrix increases the stability and therefore resistance of the sintered ceramic core to deformation at metal casting temperatures (e.g. 1200° C.–1550° C.) typically encountered. In particular, core stability (as measured in a cantilever slump test) is surprisingly increased by approximately 6 times compared to the rigidity of the ceramic core made by the invention without ceramic whiskers.

In the cantilever slump test, ceramic core test bars having identical dimensions (e.g. a 5 inch length, ½ inch width and ¼ inch thickness) are held in a horizontal plane by a fixture that grips one inch of an end of the bar, leaving four inches of the bar horizontally cantilevered. The bar is then subjected to a temperature (firing) schedule simulating that to which the ceramic core is exposed during actual casting of molten metal therearound. The distance that the free end of bar slumps or drops downwardly is measured as an indication of core rigidity under high temperature casting conditions. In such cantilever slump tests, the whisker reinforced ceramic cores made in accordance with the method of the invention set forth hereinabove exhibited approximately 6 times less slumping than cores made in accordance with the invention without whisker reinforcements therein. Ceramic cores made in accordance with the invention without whiskers are generally comparable in high temperature stability to silica-based cores made by transfer molding techniques.

Moreover, the presence of the ceramic whiskers in the dried core shaped body 30 has been observed to reduce the amount of shrinkage of the ceramic core 30 during the firing (sintering) step. Reduced shrinkage provides enhanced dimensional control of the sintered ceramic cores made in accordance with the invention. As a result, use of these porous, sintered, whisker-reinforced ceramic cores results in more dimensionally consistent metal airfoils cast therearound.

Those skilled in the art will appreciate that the preferred method of the invention is not limited to use of the ceramic whiskers described in detail hereinabove and that other types of ceramic reinforcing media, such as ceramic fibers, cloth, felt, etc., may be included in the ceramic core to this same end.

Although the method of the invention has been described hereinabove with the core shaped body 30 disposed on its side between the ceramic setters 40,42 during the thawing, drying and sintering steps, the method also envisions supporting the core shaped body 30 in other ways during these process steps. For example, FIG. 6 illustrates a core shaped body 30' of a less complex shape; e.g., a cylindrical shape, supported on its end on a simple fired ceramic setter 50 for thawing, drying and sintering. Generally, the shape, thickness, dimensions and other configurational features of the desired ceramic core will determine in what manner the core shaped body should be supported during thawing, drying and sintering to obtain optimum results.

Those skilled in the art will appreciate that the invention provides a method of making ceramic cores as well as other articles of particulate material in a manner that is cost effective as far as materials, equipment and processing steps are concerned. In addition, the method of the invention eliminates the need for special treatment of the ceramic slurry to remove excess liquid binder constituents. The need to "prebake" the molded core shape in binder absorbing packing media or to dry the molded core shape in vacuum equipment is also eliminated. Moreover, the firing step to sinter the ceramic core can be carried out in a straightforward, fast manner without complex temperature schedules. All of these advantages are achieved without compromising the physical or chemical properties of the ceramic core.

Moreover, by including reinforcing media (e.g., the ceramic whiskers described hereinabove) in the ceramic slurry, ceramic cores having significantly improved dimensional control and high temperature properties are obtainable to provide more consistent metal components cast around the ceramic cores.

Although the invention has been described in terms of specific embodiments thereof, it is to be understood that modifications and changes can be made thereto within the scope of the invention and appended claims.

What is claimed is:

1. A method of making a ceramic core useful in the casting of molten metal therearound, comprising the steps of:
  (a) forming a ceramic slurry of a freezable liquid, a ceramic powder and a gelling agent,
  (b) forming the ceramic slurry into a core shaped body including:
    (1) shaping the ceramic slurry into a core shaped body by introducing the slurry into a core shaped mold cavity and reducing the temperature of the slurry at least to the freezing temperature of said liquid to freeze the slurry in the mold cavity and form a frozen core shaped body therein, (2) removing the frozen core shaped body from the mold cavity, (3) raising the temperature of the frozen core shaped body after removal from the mold cavity to an ambient temperature above the freezing temperature, (4) gelling the gelling agent and the liquid existing at a temperature above the freezing temperature such that a gel is present in the core shaped body at the ambient temperature to retain the freeze formed core shape at the ambient temperature, and (c) heating the core shaped body after step (b) to form a sintered ceramic core.

2. The method of claim 1 wherein the liquid and the gelling agent form the gel as the temperature is reduced in step (b)(1).

3. The method of claim 1 wherein in step (b)(3) the frozen article shaped body is thawed to room temperature.

4. The method of claim 1 wherein the gelling agent comprises a gelatin exhibiting gelling in aqueous solution at about room temperature and below to the freezing temperature of the liquid.

5. The method of claim 4 wherein the gelling agent comprises a protein gelling agent.

6. The method of claim 1 wherein the freezable liquid comprises water.

7. The method of claim 1 wherein the ceramic powder further includes a ceramic fluxing agent.

8. The method of claim 1 wherein the ceramic powder comprises predominantly fused silica.

9. The method of claim 1 wherein in step (b)(1) the ceramic slurry is introduced into a mold maintained at a temperature below the freezing temperature of the liquid.

10. The method of claim 1 wherein in step (b)(3), the temperature of the frozen core shape is raised by thawing under ambient temperature and pressure conditions while the frozen core shaped body is supported on a lateral side thereof.

11. The method of claim 1 wherein in step (b)(3), the temperature of the frozen core shaped body is raised by thawing under ambient temperature and pressure conditions while the frozen core shaped body is supported on an end thereof.

12. The method of claim 1 including, after step (b), drying the core shaped body at room temperature to evaporate some of the liquid prior to step (c).

13. The method of claim 4 wherein the ceramic slurry also includes reinforcement media therein.

14. The method of claim 11 wherein the reinforcement media comprises ceramic particulate.

15. The method of claim 14 wherein the reinforcement particulate is dispersed in the sintered ceramic core.

16. The method of claim 1 wherein, after step (b)(2), the frozen core shaped body is recycled back to the ceramic slurry for mixing with fresh ceramic slurry for reshaping in step (b)(1).

17. The method of claim 1 including after step (b) and prior to step (c), removing flash and/or parting lines from the core shaped body.

18. The method of claim 1 wherein the liquid and the gelling agent form the gel as the temperature is raised above the freezing temperature to the ambient temperature in step (b) (3).

19. A method of making a ceramic core useful in the casting of molten metal therearound, comprising the steps o:

(a) forming a ceramic slurry of water, ceramic powder and a water soluble gelling agent, (b) forming the ceramic slurry into a core shaped body including:

(1) shaping the ceramic slurry into a core shaped body by injecting the slurry into a core shaped mold cavity and reducing the temperature of the slurry at least to the freezing temperature of water to freeze the slurry in the mold cavity and form a frozen core shaped body therein, (2) removing the frozen core shaped body from the mold cavity, (3) thawing the frozen core shaped body to raise its temperature to room temperature, (4) gelling the gelling agent and the liquid existing as the temperature of the core shaped body is raised from the freezing temperature to room temperature in step (b) (3) such that a gel is present in the core shaped body at room temperature effective to retain the freeze formed core shape at room temperature, and (c) heating the core shaped body after step (b) to form a sintered ceramic core.

20. The method of claim 19 wherein the gelling agent is a protein gelling agent exhibiting gelling in aqueous solution at about room temperature and below to the freezing temperature of the liquid.

21. The method of claim 19 wherein the ceramic slurry includes reinforcement media.

22. The method of claim 21 wherein the reinforcement media comprises ceramic particulate.

23. The method of claims 19 including after step (b), drying the article shaped body at the ambient temperature to evaporate some of the liquid prior to step (c).

24. A method of making a ceramic core useful in the casting of molten metal therearound, comprising the steps of:

(a) forming a ceramic slurry of a freezable liquid, a ceramic powder and a protein gelling agent that is soluble in the liquid and exhibits gelling in solution in said liquid at about room temperature and below to the freezing temperature of said liquid, (b) forming the ceramic slurry into a core shaped body including:

(1) shaping the slurry into an article shaped body by introducing the slurry into an article shaped mold cavity and reducing the temperature of the slurry at least to the freezing temperature of said liquid to freeze the slurry in the mold cavity and form a frozen article shaped body therein, (2) removing the frozen core shaped body from the mold cavity, (3) raising the temperature of the frozen core shaped body to room temperature after removal from the mold cavity, (4) gelling the liquid and the gelling agent at a temperature above the freezing temperature such that a gel is present in the article shaped body at said room temperature to retain the freeze formed article shape at said room temperature, and (c) heating the core shaped body after step (b) to form a sintered ceramic core.

25. A method of making a ceramic core useful in the casting of molten metal therearound, comprising the steps of:
    (a) forming a ceramic slurry of a freezable liquid, a ceramic powder including a fluxing agent, and a gelling agent,
    (b) forming the ceramic slurry into a core shaped body including:
        (1) shaping the slurry into an article shaped body by introducing the slurry into an article shaped mold cavity and reducing the temperature of the slurry at least to the freezing temperature of said liquid to freeze the slurry in the mold cavity and form a frozen article shaped body therein,
        (2) removing the frozen core shaped body from the mold cavity,
        (3) raising the temperature of the frozen core shaped body after removal from the mold cavity to an ambient temperature above the freezing temperature,
        (4) gelling the liquid and the gelling agent at a temperature above the freezing temperature such that a gel is present in the article shaped body at the ambient temperature to retain the freeze formed article shape at the ambient temperature, and
    (c) heating the core shaped body after step (b) to form a sintered ceramic core.

26. A method of making a ceramic core useful in the casting of molten metal therearound, comprising the steps of:
    (a) forming a quantity of a ceramic slurry comprising a freezable liquid, a ceramic powder and a gelling agent,
    (b) forming a portion of the ceramic slurry into a core shaped body including:
        (1) shaping said portion of the slurry into an article shaped body by introducing the slurry into an article shaped mold cavity and reducing the temperature of the slurry at least to the freezing temperature of said liquid to freeze the slurry in the mold cavity and form a frozen article shaped body therein,
        (2) removing the frozen core shaped body from the mold cavity,
        (3) returning the frozen core shaped body to the quantity of the ceramic slurry for remixing therewith,
    (c) shaping a portion of the remixed ceramic slurry into another core shaped body by
        (1) introducing said portion of the remixed ceramic slurry into a core shaped mold cavity and reducing the temperature thereof at least to the freezing temperature of said liquid to freeze the remixed slurry in the mold cavity and form another frozen core shaped body therein,
        (2) removing said another frozen core shaped body from the mold cavity,
        (3) raising the temperature of said another frozen core shaped body after removal from the mold cavity to an ambient temperature above the freezing temperature,
        (4) gelling the liquid and the gelling agent at a temperature above the freezing temperature such that a gel is present in said another core shaped body at the ambient temperature to retain the freeze formed core shape at the ambient temperature, and
    (d) heating said another core shaped body after step (c) to form a sintered ceramic core.

27. A method of making a ceramic core useful in the casting of molten metal therearound, comprising the steps of:
    (a) forming a ceramic slurry of a freezable liquid, a ceramic powder and a gelling agent,
    (b) forming the ceramic slurry into a core shaped body including:
        (1) shaping the ceramic slurry into a core shaped body by introducing the slurry into a core shaped mold cavity and reducing the temperature of the slurry at least to the freezing temperature of said liquid to freeze the slurry in the mold cavity and form a frozen core shaped body therein,
        (2) removing the frozen core shaped body from the mold cavity,
        (3) raising the temperature of the frozen core shaped body after removal from the mold cavity to an ambient temperature above the freezing temperature,
        (4) gelling the liquid and the gelling agent at a temperature above the freezing temperature such that a gel is present in the article shaped body at the ambient temperature to retain the freeze formed article shape at the ambient temperature,
    (c) removing any flash and parting line formed on the frozen core shaped body by step (b) (1) after the temperature of the core shaped body is raised to said ambient temperature, and
    (d) heating the core shaped body after step (c) to form a sintered ceramic core.

* * * * *

UNITED STATES PATENT AND TRADEMARK OFFICE
CERTIFICATE OF CORRECTION

PATENT NO. : 5,014,763
DATED : May 14, 1991
INVENTOR(S) : Gregory R. Frank

It is certified that error appears in the above-indentified patent and that said Letters Patent is hereby corrected as shown below:

```
Column 5, line 1, delete "Mobilicer" and insert
                    --Mobilcer--;
Column 5, line 60, delete "o" and insert --of-- therefor;
Column 6, line 41, delete "stat" and insert --state--
                    therefor;
Column 3, line 32, after "shaped" delete --shaped--;
Column 3, line 47, after "invention" insert --is--
                    therefor;
Column 8, line 11, delete "shaped core" and insert --core-
                    shaped-- therefor.
```

Signed and Sealed this

Eighth Day of March, 1994

Attest:

BRUCE LEHMAN

*Attesting Officer*  *Commissioner of Patents and Trademarks*